C. M. ALEXANDER AND G. H. TABER, Jr.
PROCESS OF CATALYZING OIL AND APPARATUS THEREFOR.
APPLICATION FILED MAR. 14, 1916.
1,381,098.
Patented June 14, 1921.
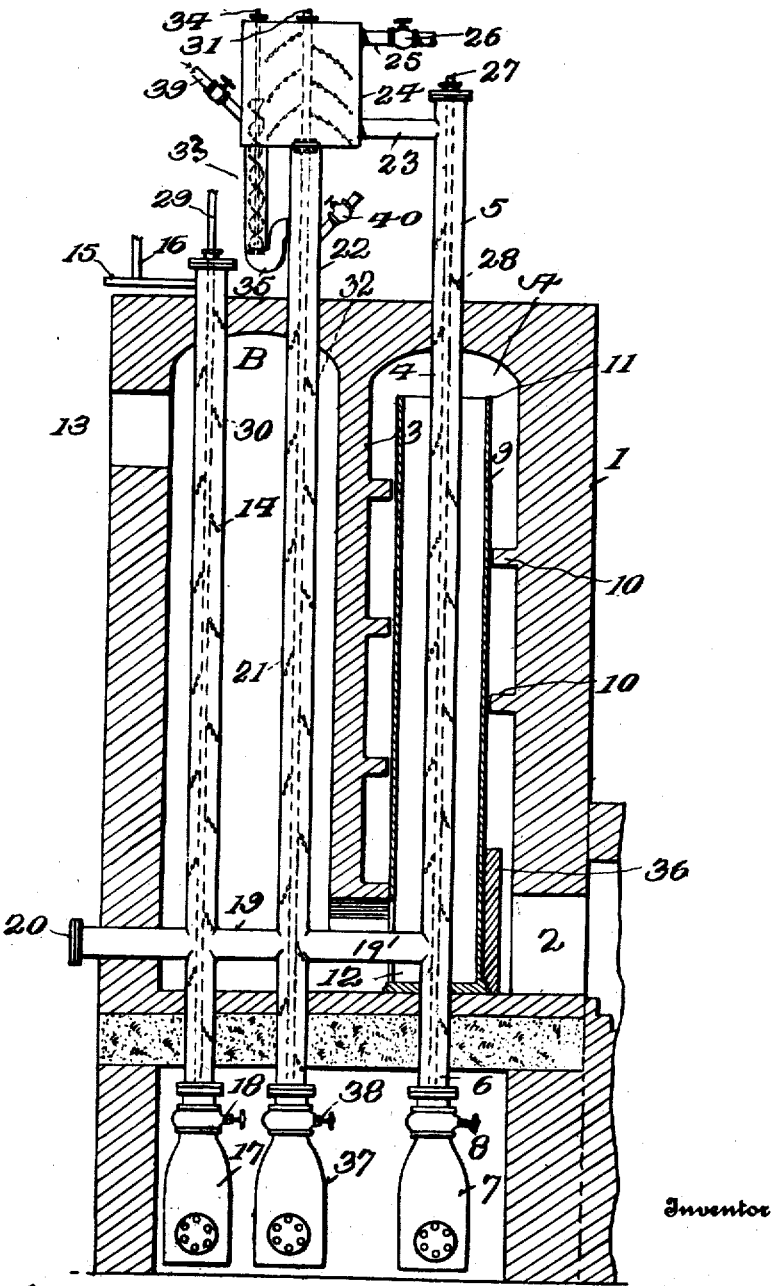

UNITED STATES PATENT OFFICE.

CLIVE M. ALEXANDER, OF PORT ARTHUR, TEXAS, AND GEORGE H. TABER, JR., OF PITTSBURGH, PENNSYLVANIA, ASSIGNORS TO GULF REFINING COMPANY, OF PITTSBURGH, PENNSYLVANIA, A CORPORATION OF PENNSYLVANIA.

PROCESS OF CATALYZING OIL AND APPARATUS THEREFOR.

1,381,098.   Specification of Letters Patent.   Patented June 14, 1921.

Application filed March 14, 1916. Serial No. 84,210.

*To all whom it may concern:*

Be it known that we, CLIVE M. ALEXANDER and GEORGE H. TABER, Jr., citizens of the United States, and residents of Port Arthur, in the county of Jefferson and State of Texas, and of Pittsburgh, in the county of Allegheny and State of Pennsylvania, respectively, have invented certain new and useful Improvements in Processes of Catalyzing Oil and Apparatus Therefor, of which the following is a specification.

This invention relates to processes of catalyzing oil and apparatus therefor; and it comprises a method of catalytically converting high boiling oils into lower boiling oils, whether these high boiling oils be of aromatic nature, as in the case of "solvent naphtha" (a coal tar product) and the like, or of petroleum oils, wherein such oils in a vapor form are intermingled with vapors of a catalyzing metallic halid, such halid being advantageously a chlorid; the vapors of the metallic halid and the vapors of the hydrocarbon being allowed to react upon each other for a suitable length of time and the halid vapors and hydrocarbon vapors being subsequently separated and the hydrocarbon vapors condensed and collected for use; and it also comprises as a new organization of apparatus elements useful in the performance of such process a heated reaction chamber having an unheated upper extension, a fractional condensation chamber communicating therewith, a catalyst reheating chamber in communication both with said reaction chamber and said condensation chamber and means for introducing hydrocarbon vapors or gases into such reaction chamber; all as more fully hereinafter set forth and as claimed.

As is well known, upon submitting the high boiling hydrocarbon oils, which are relatively complex bodies, to high heat, they break down with the production of simpler bodies; and by suitable regulation of temperature and other conditions, notably pressure, the breaking down may be so controlled as to obtain large yields of low boiling oils of the nature of gasolene. At higher temperatures than those used in making gasolene the result is still simpler bodies, such as gas. The operation of breaking down high boiling oils into low boiling oils is known in the art as cracking and many specific ways of performing it have been patented or described. All these cracking methods however tend to give bodies which are "unsaturated"; that is contain too little hydrogen for the amount of carbon which is present. Unsaturated products are not as desirable as saturated for a number of reasons. Other methods of converting high boiling oils into low boiling oils rest upon the use of various catalytically acting chemicals of which aluminum chlorid is the best known. These processes tend to give saturated products and may be advantageously used in manufacturing clean, sweet gasolene from such comparatively cheap high boiling petroleum materials as gas oil, solar oil, petroleum residuums, low grade petroleum crudes, etc. These methods however suffer from the difficulty that the catalyst is a relatively expensive material, particularly in the case of aluminum chlorid and needs frequent regeneration. Regeneration, particularly in the case of aluminum chlorid, is more or less difficult and expensive. Under the ordinary distilling conditions for petroleum oils the other catalysts of like nature such as ferric chlorid, zinc chlorid, etc., mixed with such oils are but little reactive. The lack of efficiency in the latter catalysts and the relatively limited period of activity of aluminum chlorid are probably due in large part to the difficulty of maintaining these catalysts in effective contact with the oil, in which they are not soluble to any considerable extent; and to the relatively low range of temperatures necessitated by working with oil at a temperature not above its boiling point.

In the present invention we obviate the stated disadvantages and secure certain new advantages by conducting the operation with use of both the oil and the catalyst in the vapor condition. Vapors, unlike many liquids, are of course indefinitely miscible and there is no difficulty in securing an intimate contact of catalyst and oil vapor or any desired relative concentration of the two. Operating with the catalyst and oil in the vapor condition offers many other advantages. Any desired temperature, pressure, concentration and time of contact in the reaction chamber can be used and readily controlled. Also carbon which separates in the reaction zone may be readily and continuously removed from the zone of reaction without carrying substantial amounts of catalyst with it. Catalysts of the nature of those here contemplate usually separate more or less free carbon from oil; this carbon generally being of a coky nature.

In the present invention therefore we supply to a suitable heated reaction chamber vapors of oil and vapors of the particular catalyst employed, as for instance aluminum chlorid. The reaction chamber may be kept heated by any suitable means. The oil vapors and the catalyst vapors may be introduced into the reaction chamber through separate conduits, or, and more advantageously, in the case of the more difficultly volatile catalysts, the oil vapors on their way to the reaction chamber may be caused to sweep over or through a body of molten catalyst and carry forward vapors of such catalyst. In the case of zinc chlorid, which boils at 730° C., the vapor tension is nevertheless quite considerable at much lower temperatures, say 400° or 500° C. so that a body of oil vapors at such a temperature sweeping over a molten body of zinc chlorid will carry forward enough vapor of zinc chlorid to be effective for the present purposes. Instead of using oil vapors, the vapors of zinc chlorid or of the other catalyst employed may be carried into the reaction chamber by a stream of permanent gases; say, hydrogen, "still" gases, etc. In the use of "still" gases, there is the advantage that some portion of them may be reconverted into liquefiable hydrocarbon oils by the operation itself. In the case of hydrogen there is the advantage that it may take part to some extent in the actions in producing saturated bodies. Hydrogen-rich gas suitable for this purpose may be made by breaking up still gases or other hydrocarbon gases or vapors by the aid of a high heat.

We may use any of a large number of catalytically operating metallic halids. Ordinarily we find the chlorids better than the bromids or iodids and we shall therefore speak more specifically hereinafter of the chlorids. Aluminum chlorid is well adapted for our present purposes. Ferric chlorid is also well adapted. Zinc chlorid has a high volatilizing point and requires special expedients in operation. Vapors of aluminum chlorid and ferric chlorid on the other hand may be directly produced and directly introduced into the reaction chamber. Antimony chlorid, titanium chlorid, arsenic chlorid, mercuric chlorid, tin tetrachlorid, silicon chlorid, zirconium chlorid, cadmium chlorid, etc., may be used for special purposes but offer no substantial advantages over aluminum chlorid and ferric chlorid for general use. They may however be used for special purposes. The use of ferric chlorid and of aluminum chlorid offer the great convenience that they may be separated from the oil vapors by fractional condensation. The temperature used or necessary in the reaction chamber varies of course not only with the particular oil used but with the catalyst. The temperature in all cases must of course be sufficient to introduce the oil into the reaction chamber as a vapor and maintain it as such. With relatively low boiling oils, such as kerosene, gasolene and the like, and a readily reactive and volatile metallic halid, such as aluminum chlorid, the temperatures in the reaction chamber may be comparatively low; down as low as, say, 200° C. With the less volatile ferric chlorid, the temperatures may range as low as 300° C. With an oil of much higher boiling point, such as gas oil, petroleum residuums and the like, the temperature necessary for formation and maintenance of the oil in the vapor condition is of course much higher; say 400° to 500° C. If the temperature is carried much higher, say up to 700° or 800° C. more or less cracking of the vapors takes place simultaneously with the action of the catalyst. This however, is, or may be, an advantage. In the presence of a diluent returned gas, reintroduced as hereinafter specified, the temperatures necessary to maintain the oil and catalyst in the vapor form in the reaction chamber may be lowered. With zinc chlorid and other metallic halids of relatively high vaporizing point the temperature in the reaction chamber must be quite high, even if a relatively low boiling oil is employed. The particular temperature used depends in all cases upon the time factor afforded, the nature of the oil and the particular catalyst used as well as the results to be accomplished.

In the accompanying illustration we have shown, more or less diagrammatically, an assemblage of apparatus elements adapted for use in the performance of the described process. In this showing, the figure is a view in vertical section, certain parts being shown in elevation.

In this showing, element 1 indicates as a whole a furnace casing or fire chamber. Flame gases may be supplied thereto through port 2 from a suitable source (not shown), such as a burner, fire chamber, etc. As shown, this fire chamber is divided into two compartments, A and B, by vertical partition 3. As shown, in chamber A is tubular reaction chamber 4 having an upward vertical unheated extension 5 and a downward unheated extension 6 communicating with tar or carbon pot 7, valve 8 being provided between the two. Surrounding this reaction chamber, as shown, is a sleeve 9 extending nearly to the top of chamber A and open at its top intended to aid in producing an even heat. This sleeve is not necessary but its use is advantageous. As shown, baffles 10 in the chamber A provide for a tortuous circulation of fire gases around the sleeve. Fire gases passing around the sleeve to its top 11 pass thence downward through the interior of the sleeve and around the reaction chamber to a point of exit in conduit 12. This conduit leads the fire gases into heating chamber B. From the top of this heating chamber waste gases pass through exit 13 to any suitable point of use (not shown) where the remaining heat can be utilized. Depending through the chamber B is an oil vaporizer 14 provided with inlet conduit 15 for oil and 16 for gases or vapors. At its base the oil vaporizer communicates with another tar or carbon pot 17, valve 18 being provided therebetween. Oil vapors from the vaporizing chamber pass throug lateral conduits 19 and 19' into the base of the reaction chamber. As shown, this lateral conduit extends outside the furnace casing and is closed at 20 to allow cleaning out. Also communicating with this conduit is the catalyst return and reheater chamber 21 extending upwardly above the furnace casing as extension 22. The reaction chamber discharges vapors through exit conduit 23, to partial condensation chamber 24. This partial condensation chamber may be, as shown, merely air cooled. At its top it is provided with vapor exit 25 valved at 26 and leading to any suitable condensing means (not shown). At its base, this partial condensation chamber 24 communicates with the catalyst reheating chamber 21. The reaction chamber 4 is advantageously provided with scraping means 27, shown as a rotary shaft provided with chain scrapers 28. The oil vaporizing chamber 14 may be provided with a similar rotary shaft 29 carrying chains 30. The catalyst preheating chamber 21 and partial condensation chamber 24 are also shown as provided with these agitating means, represented as rotary shaft 31 carrying chains 32. Condensed catalyst from the partial condensation chamber 24 is returned to the catalyst preheating chamber 21 through conduit 33 provided with special worm feed. Communication is through trap conduit 35. Direct impingement of fire gases on the base of the sleeve stated may be prevented by wall 36. The catalyst preheating chamber may also be provided with tar pot 37, communication with which may be established by opening valve 38. Valved conduit 39 may be provided for adding fresh catalyst from time to time to the catalyst preheater.

The apparatus as shown is particularly adapted for the practice of the present process with aluminum chlorid or ferric chlorid or a mixture of both. Its design and operation must of course be varied somewhat in the case of each catalyst for reasons which will be apparent; but the type shown is advantageous with ferric chlorid and with aluminum chlorid.

As stated, the present process is applicable to the treatment of any high boiling hydrocarbon oil, such as the various high boiling coal tar distillates (solvent naphtha), gas oil, solar oil, fuel oil, high boiling crude oils, etc., for the purpose of catalytically producing low boiling oils, whether these low boiling oils be of aromatic nature (benzol and toluol) or of petroleum character (gasolene). We shall hereinafter describe its use with gas oil, say of 30° B. as illustrative. Coal tar naphtha may be treated in exactly the same way to produce benzol. Gas oil under as much pressure as may be desired is introduced into 14 through inlet 15. If desired, permanent hydrocarcon gases, or hydrocarbon vapors may also be introduced at 16 together with the oil. Pressure may be afforded on either oil or vapors by suitable pumps (not shown). In 14 the oil is vaporized and the heavy vapors pass downwardly, becoming heated to any temperature desired, and laterals through conduits 19 and 19' into the reaction chamber 4. In 14 the vapors may or may not be cracked to a substantial extent. Any unvaporized residues, tar, etc., pass through into receiver 17. In the reaction chamber 4 the hot vapors are subjected to the action of hot vapors of catalyst coming from the catalyst preheating and returning device 21 and also entering 4 through conduit 19'. The mixture of oil vapors and vapors of catalyst passes upward through 4 wherein reaction takes place. In 21 more or less cracking of the oil vapors may take place, with production of vapors of cracked and unsaturated products, and in this event cracking may continue for a time as the vapors pass upwardly through 4, which is at a higher temperature than 21; but in the upward passage of the mixture of hydrocarbon vapors and catalyst through 4, unsaturated bodies are converted into saturated. Coke and other solid and difficultly vaporizable products of reaction fall downward through 4 and accumulate in 7. Gate valve 8 may be closed from time to time to permit cleaning. The reacting mixture of vapors passes upward from 4 and is somewhat cooled in 5. Element 5 acts as a partial reflux condenser since it is air-cooled; the amount of condensation here occurring of course depending on the heating applied to element 4. By regulating the condensation in 5 the greater amount of the catalyst vapors may be kept within the reaction chamber A below 5 since such vapors may be condensed in 5 and run back into 4 for revaporization. This is particularly true where a very high boiling catalyst such as zinc chlorid is employed. The mixture of oil vapors and any uncondensed catalyst gains access through vapor conduit 23 to the partial condenser 24. This partial condenser may be, as shown, merely an air cooled chamber; or it may be provided with a special cooling means (not shown). In 24 the catalyzer, if of the nature of ferric chlorid or aluminum chlorid, is condensed and is separated from the oil vapors. The condensed catalyst passes downward into 21 where it is reheated and revaporized, the hot vapors joining the oil vapors in 19 and passing back into the reaction chamber. In the case of catalyzers having a relatively high boiling point, such as zinc chlorid, the catalyzer may be accumulated to some extent in 19 in liquid form; but its vapors are swept forward by the oil vapors and the accumulation does not go beyond a certain point. The gasolene, etc., vapors produced in the action after separation of the catalyst in 24 pass outward through 25 for suitable condensation. By suitable adjustment of valve 26 the whole apparatus may be kept under as much pressure as may be desired.

In normal operation of the apparatus, using aluminum chlorid, little or no chlorid passes downward into the chamber 7. Such losses as may occur may be made up by additions of fresh catalyst through inlet 39.

Ferric chlorid may be used in exactly the same manner as aluminum chlorid. While ferric chlorid in liquid oils, even at the boiling temperature of the oil, is not so reactive as aluminum chlorid, yet used in the vapor state under the present invention ferric chlorid has a high degree of activity. And since ferric chlorid and the oil are both used in the vapor state there is no limit to the temperature which may be employed in producing the reaction therebetween as is the case where the oil is maintained in a liquid condition. The use of ferric chlorid is particularly convenient since not only is it cheaper to make than aluminum chlorid but it is much more easily recovered.

Zinc chlorid may be used in the apparatus shown but with somewhat more difficulty. If brought into 4 a sufficient amount of zinc chlorid vapor may be kept in circulation between reaction chamber 4 and the upper cooler 5. In the reaction chamber zinc chlorid volatilizes in and by the aid of the passing oil vapors while it condenses in 5 and runs down to the reaction chamber 4 in liquid form. With zinc chlorid, fractional condenser 24 does not function to any great extent; its use is more applicable to aluminum chlorid and ferric chlorid.

While we have described more particularly the conversion of gas oil and other high boiling petroleum oils into the lower boiling petroleum products, such as gasolene, yet it will be understood that our invention may equally well be employed for the conversion of high boiling aromatic hydrocarbons, such as the high boiling oils from coal tar, into the lower boiling aromatic oils, such as benzol and toluol.

The stated operation may be carried on under pressure greater than atmospheric, at atmospheric pressure or under reduced pressure. The pressure used varies the operation to some extent and high pressure and low pressure are both useful under particular conditions. With aluminum chlorid, the use of high pressure renders it possible to obtain the aluminum chlorid in the cooler zones of the apparatus in a liquid form so that it will run down the sides of the apparatus without the necessity of scraping off deposits of solid chlorid.

The temperatures in the present operation are, or may be, those at which the oil vapors normally used will crack so that cracking of the vapors and conversion by the catalyst may be simultaneous. In many cases this fact conduces to the rapidity of the operation, since the vapors produced by cracking are at once converted by the catalyst into saturated bodies. The temperature of the reacting vapors is ordinarily above 200° C. and, as noted *ante*, it may be very much higher; even up to 800° C. As previously noted, the particular degree of heat employed depends very largely upon the catalyst. In this cracking operation, the use of high pressure is often advantageous.

In the apparatus as shown the vapors of oil and of catalyst are introduced at the base of a vertical reaction chamber and pass upwardly therethrough but it is not necessary that the passage be upward or in a straight line. The vapors may, for instance, be introduced at the top of a reaction chamber and the reaction chamber is not necessarily a straight vertical chamber. It may, for instance, be helical or spiral and it may have a generally horizontal disposition.

As stated, where hydrocarbon gases, such as oil gas, still gases, etc., are used in the process, they may contribute materially to the formation of useful liquid products. In an advantageous embodiment of our invention, waste gases coming from the final condenser of the system, or a portion of them, are returned to the reaction space together with the oil. For this purpose inlet 16 may be provided. If desired, these gases may be exposed to a high temperature to crack them down more or less with the production of free hydrogen prior to return. Free hydrogen itself may be used. The introduction of more or less hydrogen into the reaction zone aids materially in the production of saturated compounds in even greater amount.

Saturation of the products in the present, or any process, of converting high boiling oils into lower boiling oils, must depend either upon the removal of carbon or the addition of hydrogen. By using a certain portion of hydrogen or gases rich in the same in the reaction zone, the amount of carbon deposited is lessened to some extent and the total product of oils concomitantly increased. Not only hydrogen has this beneficial effect in the reaction chamber but also the hydrogen rich gases, such as methane.

Aluminum bromid and iodid may be used in the way indicated for aluminum chlorid. The metal halids containing bromin and iodin however, although reactive in the present process, are, at the present market prices, much more expensive than the corresponding chlorids and they offer no material advantages thereover.

While we have described our process and apparatus mainly for the production of good quality, saturated low boiling oils, such as gasolene, from high boiling oils, the operation simultaneously producing such low boiling oils and effecting saturation thereof, we wish it understood that such process may be well applied to the saturation of already existing low boiling oils, such as gasolene and kerosene, of low quality; i. e., containing greater or less proportions of unsaturated bodies. In so doing, in lieu of introducing high boiling oil into reaction chamber 4 through 19 and 14, gasolene or kerosene may be so supplied, with or without a hydrogen rich gas. In so operating, it is best to use a reactive halid of low vaporizing point, such as aluminum chlorid. Ferric chlorid may be employed but, for this purpose, is less advantageous. In so operating, the condensable oils delivered at 25 past 26 may be of substantially the same boiling point as those introduced at 15. But they will be of saturated, or substantially saturated character and of greater commercial value.

Gases may be introduced into the catalyst reheating chamber through 40, as for example returned gases from beyond the condenser, oil gas, hydrogen, etc. The gas so introduced may carry with it vapors of catalyst, as for example zinc chlorid, aluminum chlorid, etc.

What we claim is:—

1. The process of converting high boiling hydrocarbon oils into lower boiling hydrocarbon oils which comprises applying heat to and heating a mixture of vapors of a reactive metal halid and vapors of such high boiling oil.

2. The process of converting high boiling hydrocarbon oils into lower boiling hydrocarbon oils which comprises applying heat to and heating a mixture of vapors of a reactive metal chlorid and vapors of such high boiling oil.

3. The process of converting high boiling hydrocarbon oils into lower boiling hydrocarbon oils which comprises applying heat to and heating a mixture of aluminum halid vapors with vapors of such high boiling oil.

4. The process of converting high boiling hydrocarbon oils into lower boiling hydrocarbon oils which comprises applying heat to and heating a mixture of aluminum chlorid vapors with vapors of such high boiling oil.

5. The process of converting high boiling hydrocarbon oils into lower boiling hydrocarbon oils which comprises producing a mixture of vapors of a reactive metal halid and vapors of oil and transmitting such mixture through a heated zone at a temperature sufficient to cause a reaction therebetween.

6. The process of converting high boiling hydrocarbon oils into lower boiling hydrocarbon oils which comprises applying heat to and heating a mixture of vapors of a reactive metal halid and oil vapors in a suitable reaction chamber, withdrawing mixed vapors from the top of such chamber, separating oil vapors from the metallic halid and returning the separated metallic halid to such reaction chamber.

7. The process of converting high boiling hydrocarbon oils into lower boiling hydrocarbon oils which comprises applying heat to and heating a mixture of vapors of aluminum chlorid and oil vapors in a suitable reaction chamber, continuously removing mixed vapors from the top of such chamber and separating aluminum chlorid therefrom, and returning such aluminum chlorid in the vapor form to such reaction chamber.

8. The process of converting high boiling hydrocarbon oils into lower boiling hydrocarbon oils which comprises applying heat to and heating a mixture of vapors of a reactive metal halid and oil vapors in a suitable reaction chamber maintained at a high temperature and having an upward extension maintained at a less temperature, and continuously removing oil vapors from such extension while returning metallic halid collected therein, reheating such halid to revaporize it and returning the vapors to the reaction chamber.

9. The process of converting high boiling hydrocarbon oils into lower boiling hydrocarbon oils which comprises introducing oil vapors and vapors of aluminum chlorid into the base of a heated vertical retort, withdrawing mingled vapors of oil and aluminum chlorid from the top of such retort and cooling the same to separate the aluminum chlorid, reheating the separated aluminum chlorid and returning the same to the base of such a retort.

10. The process of saturating and improving oils which comprises applying heat to and heating a mixture of vapors of a reactive metallic chlorid and vapors of a petroleum oil until a substantially saturated condensable product is obtained.

11. The process of saturating and improving oils which comprises applying heat to and heating a mixture of vapors of aluminum chlorid and vapors of a petroleum oil until a substantially saturated condensable product is obtained.

12. In an apparatus for producing high quality low boiling oils, a reaction chamber, means for feeding vapors of hydrocarbon oils thereto, means for feeding vapors of a metallic halid thereto, means for removing mixed halid and oil vapors from said reaction chamber, means for separating the halid vapors from the oil vapors and means for returning the so separated halid.

13. In an apparatus for producing high quality low boiling oils, a fire chamber, a retort extending therethrough, means for supplying oil vapors to one end of said retort, means for supplying vapors of a metallic halid to the same end, means for removing mixed vapors of oil and halid from the other end of said retort, means for fractionally condensing said mixture of vapors to condense such metallic halid, and reheating and revaporizing means for returning such separated halid for reintroduction into the retort with the oil vapors.

14. In an apparatus for producing high quality low boiling oils, a fire chamber, a vertical retort therein, a heating chamber, an oil vaporizing device and a catalyst reheating device in said heating chamber, a fractional condenser in communication with the top of said retort, a connection between the vaporizer and retort, means for removing oil vapors from the fractional condenser and means for introducing oil into the oil vaporizing device.

15. In an apparatus for producing high quality low boiling oils, a fire chamber, a vertical retort therein, a heating chamber, an oil vaporizing device and a catalyst reheating device in said heating chamber, a fractional condenser in communication with the top of said retort, a connection between the vaporizer and retort, means for removing oil vapors from the fractional condenser, means for introducing oil into the oil vaporizing device and means for simultaneously introducing gases thereinto.

16. In an apparatus for producing high quality low boiling oils, a furnace chamber divided into a fire chamber and a preheating chamber by a vertical wall, a vertical reaction chamber in said fire chamber having a vapor exit at or near its top, a vertical catalyst reheating chamber in the preheating chamber and in communication with said reaction chamber near its base, an oil vaporizing retort also located in said preheating chamber and also in communication with said reaction chamber near its base, a fractional condensing device receiving vapors from the top of said reaction chamber and means for returning catalyst from said fractional condensing device to said catalyst reheating chamber.

In testimony whereof, we affix our signatures hereto.

CLIVE M. ALEXANDER.
GEORGE H. TABER, Jr.

CERTIFICATE OF CORRECTION.

Patent No. 1,381,098. June 14, 1921.

CLIVE M. ALEXANDER, ET AL.

It is hereby certified that the State of Incorporation of the assignee in the above numbered patent was erroneously given as "Pennsylvania," whereas said State of Incorporation should have been given as Texas, as shown by the records of assignments in this office; and that the said Letters Patent should be read with this correction therein that the same may conform to the record of the case in the Patent Office.

Signed and sealed this 19th day of June, A. D. 1934.

Bryan M. Battey (Seal)

Acting Commissioner of Patents.